(12) United States Patent
Yen et al.

(10) Patent No.: US 7,003,365 B1
(45) Date of Patent: Feb. 21, 2006

(54) SYSTEM AND METHOD OF RESERVING CAPACITY FOR A PRE-PROCESS ORDER

(75) Inventors: Wei-Kuo Yen, Hsinchu (TW); Jen-Lin Chao, Hsinchu (TW); Wei-Chuan Huang, Hsinchu (TW); Chao-Hsin Chang, Hsinchu (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 0 days.

(21) Appl. No.: 11/001,769

(22) Filed: Dec. 2, 2004

(51) Int. Cl.
*G06F 19/00* (2006.01)

(52) U.S. Cl. ............................................ 700/99
(58) Field of Classification Search .......... 700/99–102, 700/117–121; 705/8–10, 26–29
See application file for complete search history.

(56) References Cited

U.S. PATENT DOCUMENTS

| | | | |
|---|---|---|---|
| 5,093,794 A | 3/1992 | Howie et al. ............... 364/468 |
| 6,272,389 B1 * | 8/2001 | Dietrich ...................... 700/101 |
| 6,415,195 B1 * | 7/2002 | Gleditsch et al. ............ 700/99 |
| 6,415,260 B1 | 7/2002 | Yang et al. .................. 705/10 |
| 6,463,345 B1 * | 10/2002 | Peachey-Kountz et al. ... 700/99 |
| 6,606,527 B1 * | 8/2003 | de Andrade et al. .......... 700/97 |
| 6,711,550 B1 * | 3/2004 | Lewis et al. ................. 705/10 |
| 6,728,586 B1 * | 4/2004 | Chang et al. ................. 700/99 |
| 6,731,999 B1 * | 5/2004 | Yang et al. ................. 700/102 |
| 6,757,577 B1 * | 6/2004 | Jeng et al. ................... 700/99 |
| 6,871,110 B1 * | 3/2005 | Yen et al. ................... 700/100 |
| 6,892,106 B1 * | 5/2005 | Wu et al. ................... 700/101 |
| 6,920,365 B1 * | 7/2005 | Chao et al. ................ 700/100 |

* cited by examiner

*Primary Examiner*—Maria N. Von Buhr
(74) *Attorney, Agent, or Firm*—Thomas, Kayden, Horstemeyer & Risley (57) ABSTRACT

In a foundry that produces a product family a system and method of reserving capacity for a pre-process order includes a plurality of products, a common pre-process operation and a plurality of distinct post-process operations corresponding to the products. When a pre-process order related to the pre-process operation from a customer is received, pre-process capacity and post-process operating capacity are reserved according to the pre-process order, and the pre-process capacity is provided for the pre-process. When a post-process order for a product corresponding to a specific post-process operation in the product family is received before a cutoff date, the reserved post-process operating capacity is provided for the corresponding post-process operation. If no post-process order is received before the cutoff date, the reserved post-process operating capacity is released as remnant supply. Other systems and methods are also provided.

29 Claims, 5 Drawing Sheets

SYSTEM AND METHOD OF RESERVING CAPACITY FOR A PRE-PROCESS ORDER

BACKGROUND OF THE INVENTION

1. Field of the Invention

The present invention relates to capacity reservation in the field of output planning processes, and particularly to a system and method of reserving capacity for a pre-process order for a semiconductor product family produced in a semiconductor foundry.

2. Description of the Related Art

In recent years, many enterprises or manufacturers have introduced the concept of supply chain management to integrate their internal and external resources. The supply chain entails functions of purchase of materials, transformation of these materials into intermediate and finished products, and the distribution of these finished products to customers. In the supply chain, customers transmit requests or demands can include of a request for a particular quantity of a product by a specific date to a manufacturer, and the manufacturer plans its manufacturing schedule according to these received requests to satisfy each customer.

In a manufacturing plant, such as a semiconductor foundry in which a plurality of semiconductor products is produced, it is desirable to schedule manufacturing operations based upon the quantities of the products ordered from the customer requests. Failure to properly schedule manufacturing operations may result in late manufacture of the product and/or missed customer deadlines. Accordingly, when an order from a customer is taken, it is important for manufacturing systems to deliver requested products on time. Thus, meeting delivery dates is crucial in assuring that ordered products can be provided in a timely manner.

Many conventional scheduling systems have been developed to manage the above-mentioned manufacturing scheduling. For example, U.S. Pat. No. 5,093,794 entitled "Job Scheduling System" discloses a job scheduling system, providing scheduling of a variety of jobs without special purpose coding by the use of time maps to maintain current data, as well as scheduling jobs around potential bottlenecks of shop resources in a dynamic manner.

Further, U.S. Pat. No. 6,415,260 entitled "Dynamic Capacity Demand Forecast System" discloses a capacity-demand-forecast system for the manufacture of semiconductor integrated circuits. According to the capacity-demand-forecast system, when a number of products and a plurality of processing steps are provided in a processing line, the turn ratio of each product at each stage on a specified working day is calculated and the work-in-process (WIP) or the lots of every product at each stage on the same day is determined. According to these two numbers, the WIP on the next working day can be calculated, and the next working day's flow is determined. In this way, the flow of each product at each future stage is determined, and the cumulative flow of all products at all stages in a working day is equal to the capacity demand on the processing line for that day. Throughput of wafers may thus be determined, allowing adjustment of the parameters of the processing line.

Typically, a manufacturing plant produces more than one type of product. The manufacturing processes of these products may partially comprise common technology requirements and manufacturing conditions. In this case, products sharing elements of the manufacturing process can be categorized as a "product family," a consideration not particularly emphasized in the cited patents.

Figure 1:
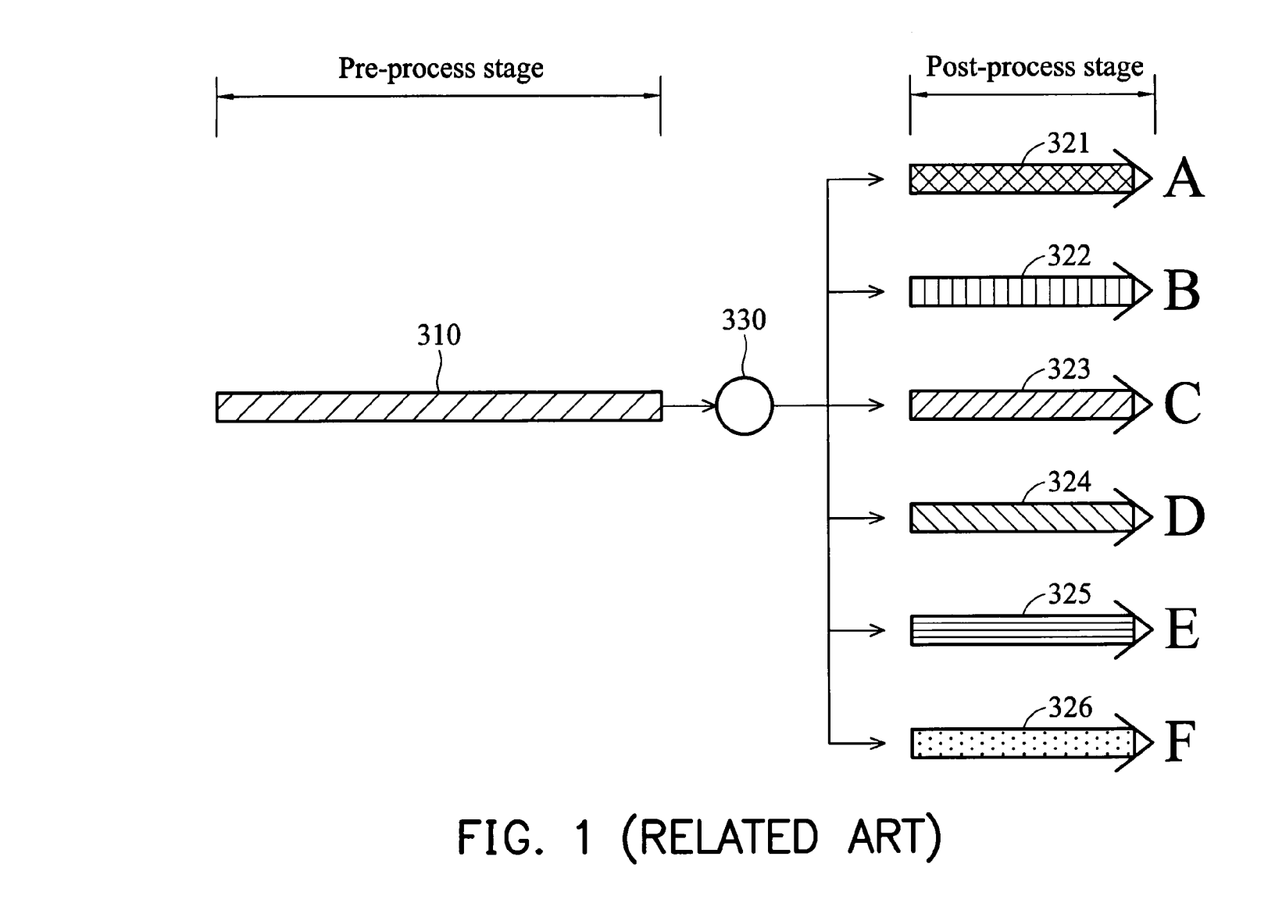
FIG. 1 is a block diagram illustrating a product family with six types of products produced in a semiconductor foundry.

FIG. 1 shows an example of a product family produced in a semiconductor foundry, in which the product family includes six types of IC chips A, B, C, D, E and F. Generally, the semiconductor foundry may have a plurality of lots. A preprocess 310 produces a component of all the six types of IC chips A to F. The fabricated components are then stored in "stock" 330, for subsequent processing. When a demand for a particular type of IC chip, e.g. IC chip C, occurs, a post-process operation 323 corresponding to IC chip C is performed on the components stored in the stock 330 to obtain the requested IC chips C. Similarly, each of the post-processing operations 321–326 corresponding to the IC chips A to F can be performed according to the demand for the product family.

In this case, generally, there are two types of orders from customers with demand for the IC chips. For example, when a customer decides that a demand for a particular type of IC chip in the product family may be required in the coming season, the customer may submit a "pre-process order," or a so-called "bank order," for the components of the product family stored in the stock 330 as shown in FIG. 1. When the components of the product family are produced and stored in the stock, the customer may further submit a follow-up order corresponding to the particular type of IC chip, e.g. IC chip C. This follow-up order is a post-process order. Products such as the IC chip, in the product family are usually categorized with a series of codes. Thus, a management model according to pre-process orders and the post-process orders of the product family can be obtained.

In production element preparation, a material requirement planning (MRP) system is generally introduced. In a manufacturing foundry fabricating the above-mentioned product family, a bill of material (BOM) for the pre-process order, which corresponds to the component, and a group of BOMs for the post-process orders, which corresponds to the products in the product family, are provided to the MRP system. Thus, when a pre-process order or a post-process order is received, material for the components is prepared according to the BOM for the pre-process order or the post-process order.

However, since the complexity of the supply chain varies greatly from industry to industry and firm to firm, production element preparation may vary. For example, in a semiconductor foundry, capacity management is significant for reducing inventory and increasing productivity. Since the manufacturing process of each semiconductor product is complicated, capacity preparation, rather than material preparation, is emphasized. Thus, the system focusing on MRP and BOMs for pre-process orders or post-process orders must be modified.

According to a system using a modified MRP system and BOM, a pre-process operation BOM, related to pre-process capacity, and a plurality of post-process operation BOMs related to post-process operating capacity are provided. When a pre-process order is received before a cutoff date, the pre-process capacity is reserved, and when a post-process order is received before the cutoff date, the post-process operating capacity is reserved.

In the manufacturing plant, e.g. the semiconductor foundry, the pre-process order is generally provided with capacity "available to promise" (ATP) support, since the components produced and stored in the stock can be interchanged. However, it is harder to predict post-process orders from the customer. Even if a post-process order is received before the cutoff date, it is possible that most of the capacity may be reserved when the manufacturing plant, e.g. the semiconductor foundry, is in full-load status. In this case, only remnant supplies are available for the post-process order, as a result of failure to properly schedule manufacturing operations.

SUMMARY OF THE INVENTION

Accordingly, an object of the present invention is to provide a system and method of reserving capacity for a pre-process order in a manufacturing plant, which provides capacity ATP support when receiving either a pre-process order or a post-process order.

Another object of the present invention is to provide a system and method of reserving capacity for a pre-process order for a semiconductor product family produced in a semiconductor foundry, enabling more effective scheduling of manufacturing operations for post-process orders.

To achieve foregoing and other objects, the invention is directed to novel systems and methods for ensuring capacity reservation of pre-process orders. In the facility producing the product family, which includes a plurality of products, a common pre-process operation and a plurality of distinct post-process operations corresponding to the products are provided. In one embodiment, the system of the present invention provides a process arrangement engine to arrange a pre-process operation and a plurality of post-process operations for the product family, which has a plurality of products corresponding to the post-process operations; an order management module to receive a purchase order for the product family before a cutoff date; and a capacity management module reserving pre-process capacity for the pre-process operation and post-process operating capacity for one of the post-process operations when the order is a pre-process order. The pre-process operation is performed, and when the order is a post-process order corresponding to a specific post-process operation, the post-process operating capacity is provided for the specific post-process operation for the product corresponding to the specific post-process operation.

The present invention can also be viewed as providing methods for reserving capacity for a pre-process order. In this regard, one embodiment of such a method, among others, includes when a pre-process order is received, pre-process capacity and post-process operating capacity are reserved according to the pre-process order, and the pre-process capacity is provided for the pre-process. Thus, when a post-process order for a product corresponding to a specific post-process operation in the product family is further received before the cutoff date, the reserved post-process operating capacity is provided for the corresponding post-process operation.

In an embodiment of the present invention, if no post-process order is received before the cutoff date, the reserved post-process operating capacity can be released as remnant supply.

Further, the capacity management module can further transfer the pre-process capacity and the post-process operating capacity to full-run capacity when an emergency order for the specific product is received before the cutoff date, and the full-run capacity is provided for sequential enablement of the pre-process operation and the corresponding post-process operation.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Disclosed herein are systems and methods for reserving capacity for a pre-process order. To facilitate description of the inventive system, an example system that can be used to implement reserving capacity for a pre-process order is discussed with reference to the figures. Although this system is described n detail, it will be appreciated that this system is provided for purposes of illustration only and that various modifications are feasible without departing from the inventive concept. After the example system has been described, an example of operation of the system will be provided to explain the manner in which the system can be used to provide for reserving capacity for a pre-process order. The preferred embodiments are further exemplified with semiconductor foundry manufacturing, i.e. wafer fabrication, with a plurality of lots. However, the present invention is not limited to the described embodiments.

Figure 2A:
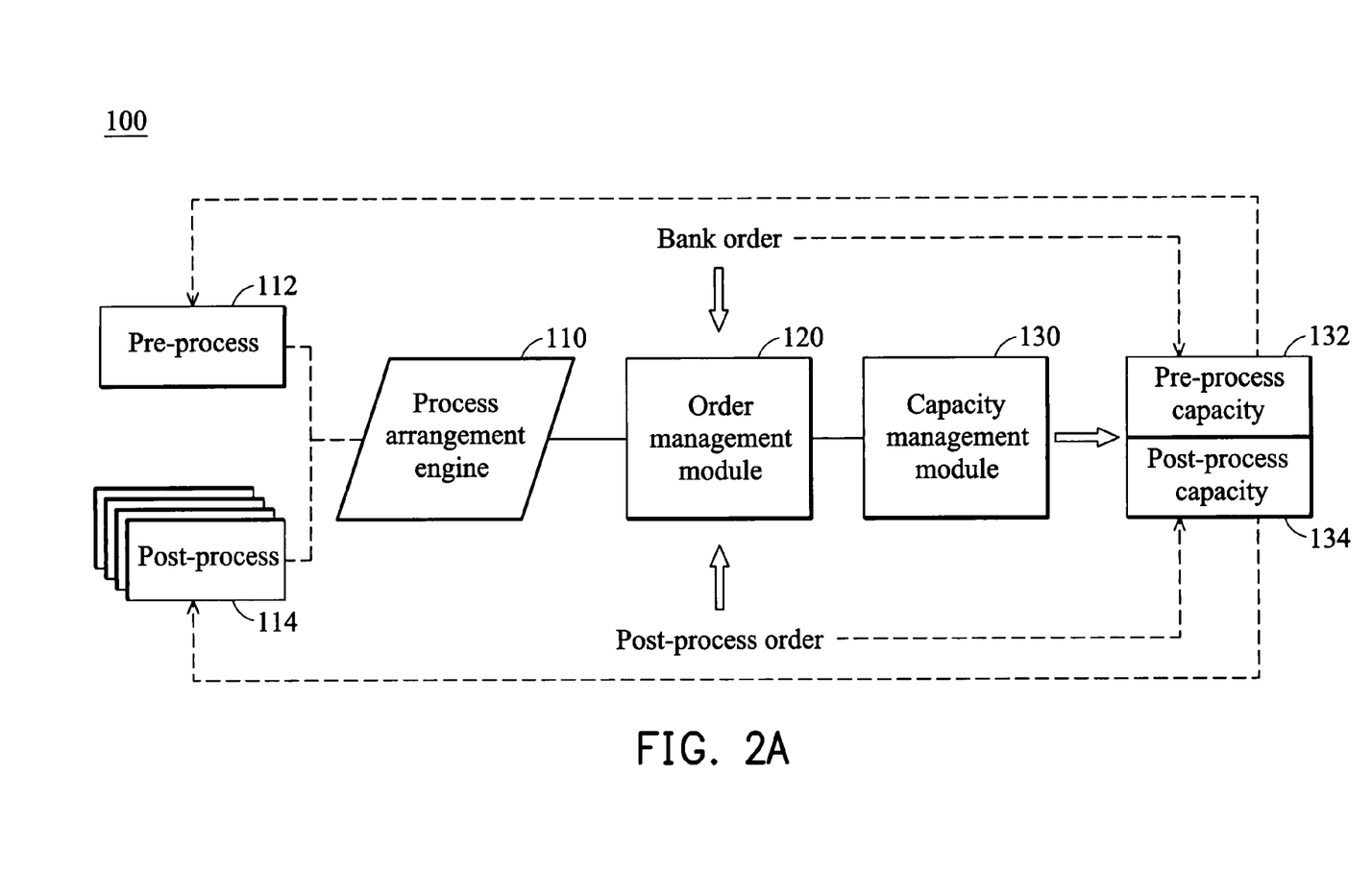
FIG. 2A is a schematic diagram depicting a preferred embodiment of a system for reserving capacity for a pre-process order of the present invention.

Referring to FIG. 2A, a preferred embodiment of the system for reserving capacity for a bank order (that is, a pre-process order) is shown. The system 100 includes a process arrangement engine 110, an order management module 120, and a capacity management module 130.

The process arrangement engine 110 arranges a pre-process operation 112 and a plurality of post-process operations 114 for a product family. The product family preferably includes a plurality of products corresponding to the post-process operations 114, i.e., a semiconductor product family with six types of semiconductor products A to F corresponding to the six post-process operations 321–326 as shown in FIG. 1.

The order management module 120 receives a purchase order (not shown) for the product family before a cutoff date. The order for the product family can be either a pre-process order or a post-process order.

The capacity management module 130 performs capacity reservation and provision processes. When an order received by the order management module 120 is a pre-process order, the capacity management module 130 reserves capacity, which includes pre-process capacity 132 for the pre-process operation 112 and post-process operating capacity 134 for one of the post-process operations 114. The capacity management module 130 provides the pre-process capacity 132 to the pre-process operation 112 to obtain the components of the product family. When the order management module 120 receives a follow-up purchase order, for example, a post-process order corresponding to a specific post-process operation 114, the capacity management module 130 provides the reserved post-process operating capacity 134 to the specific post-process operation 114 to obtain the corresponding product.

It should be mentioned that capacity requirements of each of the post-process operations 114 may differ. Accordingly, a particular post-process operation is generally selected from the post-process operations 114 as a representative post-process operation, or a first post-process operation, of the product family, and the other non-selected post-process operations are the second processes. In FIG. 1, for example, the post-process operation 323 corresponding to the semiconductor chip C is the first post-process operation of the semiconductor chip family, and the other post-process operation 321–322 and 324–326 are the second post-process operations.

Figure 2B:
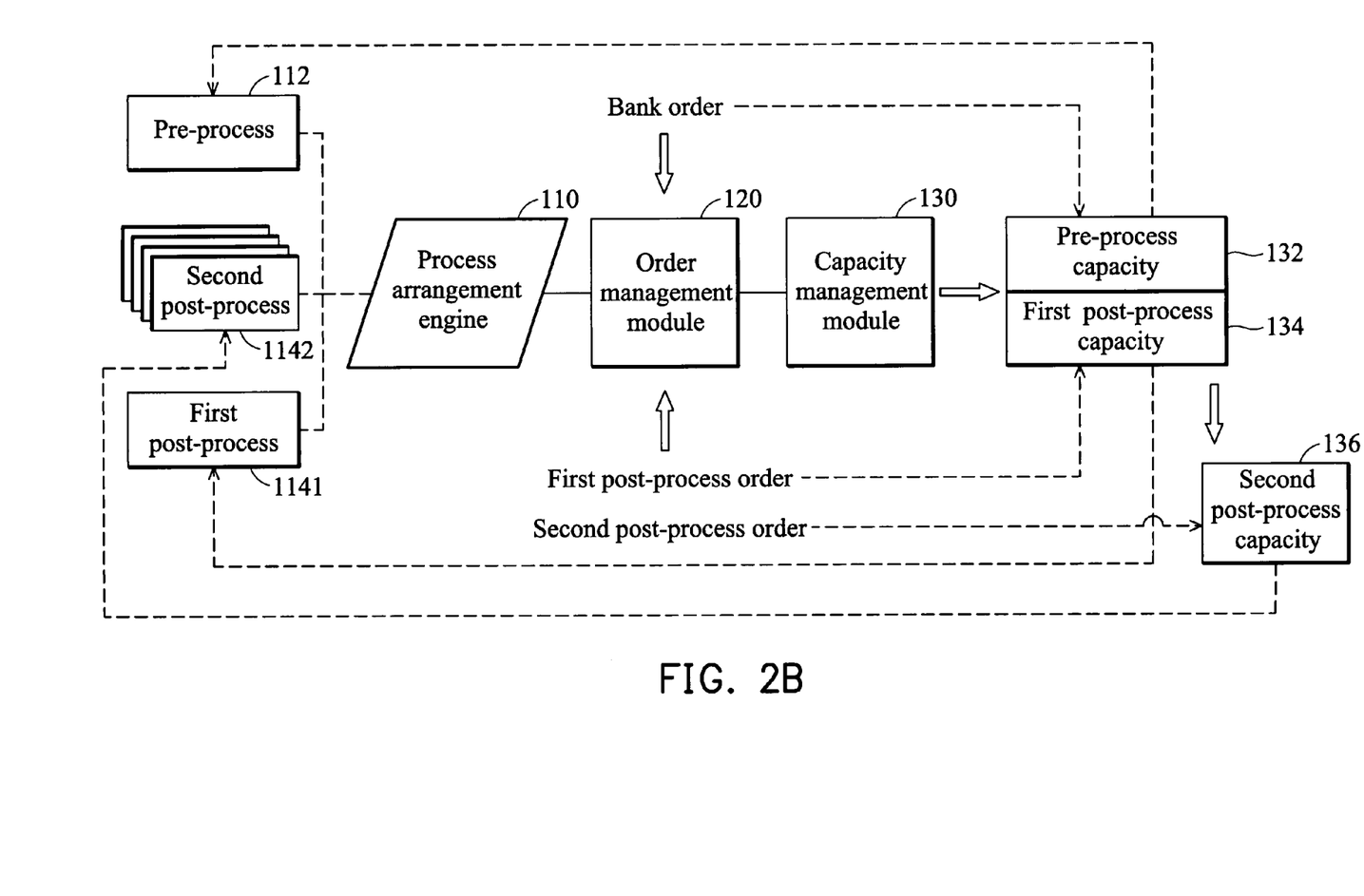
FIG. 2B is a schematic diagram depicting another preferred embodiment of a system for reserving capacity for a pre-process order of the present invention.

Accordingly, a further preferred embodiment of the system for reserving capacity for a pre-process order is hereinafter described with reference to a scheme as shown in FIG. 2B.

FIG. 2B is a schematic diagram showing a preferred embodiment of a system for reserving capacity for a pre-process order of the present invention. In FIG. 2B, the system 100 also has a process arrangement engine 110, an order management module 120, and a capacity management module 130.

The process arrangement engine 110 arranges a pre-process operation 112, a first post-process operation 1141 (that is, the representative post-process operation) and a plurality of second post-process operations 1142 for the product family.

The order management module 120 preferably receives a purchase order for the product family before a cutoff date. The order for the product family can be a pre-process order, a first post-process order or a second post-process order.

The capacity management module 130 performs capacity reservation and provision according to the order. When the order received by the order management module 120 is a pre-process order, the capacity management module 130 reserves capacity, which includes pre-process capacity 132 for the pre-process operation 112 and first post-process operating capacity 134 to the first post-process operations 114. The capacity management module 130 provides the pre-process capacity 132 for the pre-process operation 112 to obtain the components of the product family.

When the order management module 120 receives a follow-up purchase order, a first post-process order for the first post-process operation 1141, the capacity management module 130 provides the reserved first post-process operating capacity 134 to the first post-process operation 1141 to obtain the corresponding first product.

On the other hand, when the order management module 120 receives a follow-up purchase order, a second post-process order to a specific second post-process operation 1142, the capacity management module 130 transfers the reserved first post-process operating capacity 134 to second post-process operating capacity 136, and provides the transferred second post-process operating capacity 136 to the specific second post-process operation 1142 to obtain the corresponding second product.

Figure 3A:
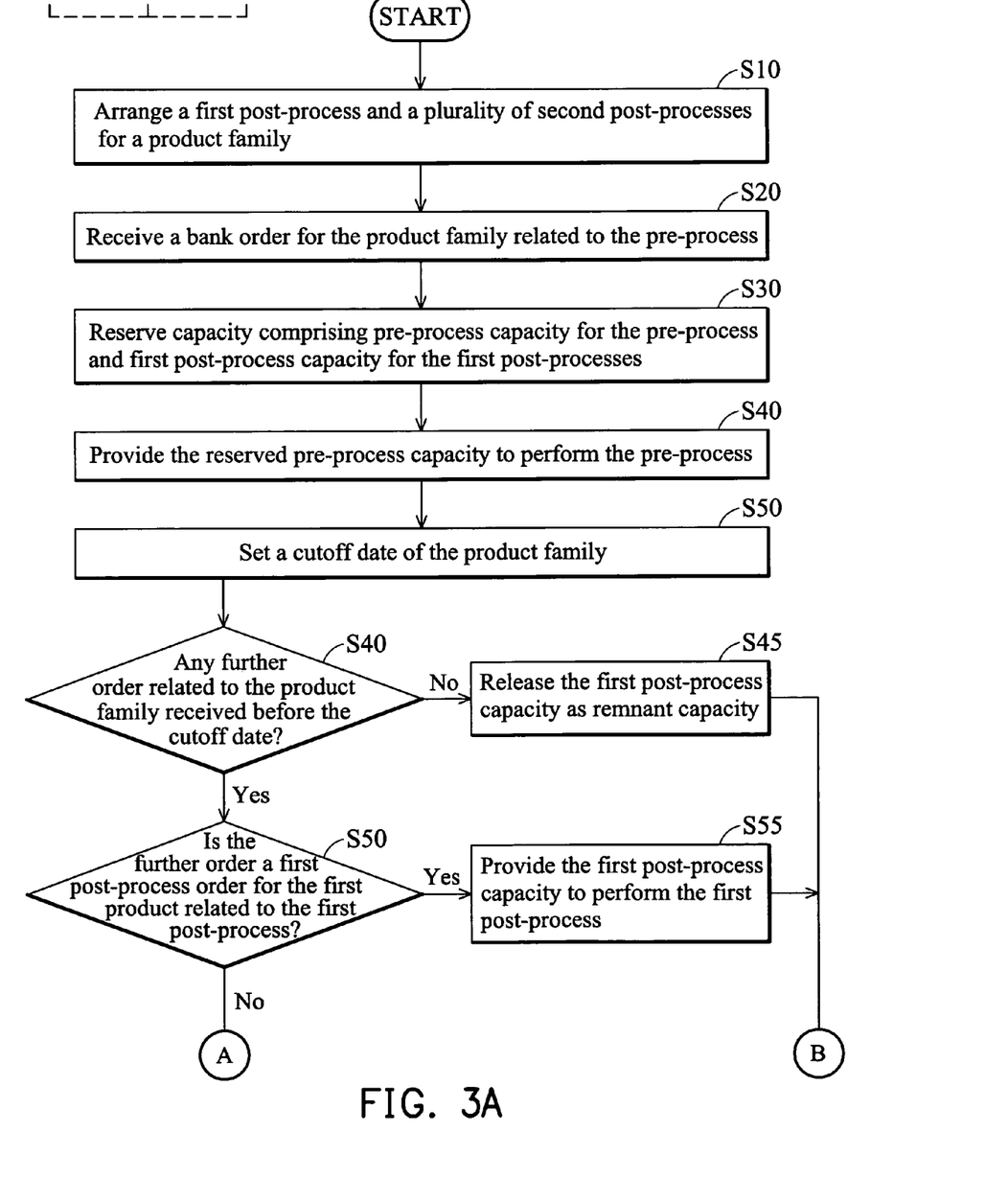
FIGS. 3A and 3B are flowcharts depicting functionality, in accordance with one preferred embodiment, of an implementation of reserving capacity for a pre-process order according to the system shown in FIG. 2B.
Figure 3B:
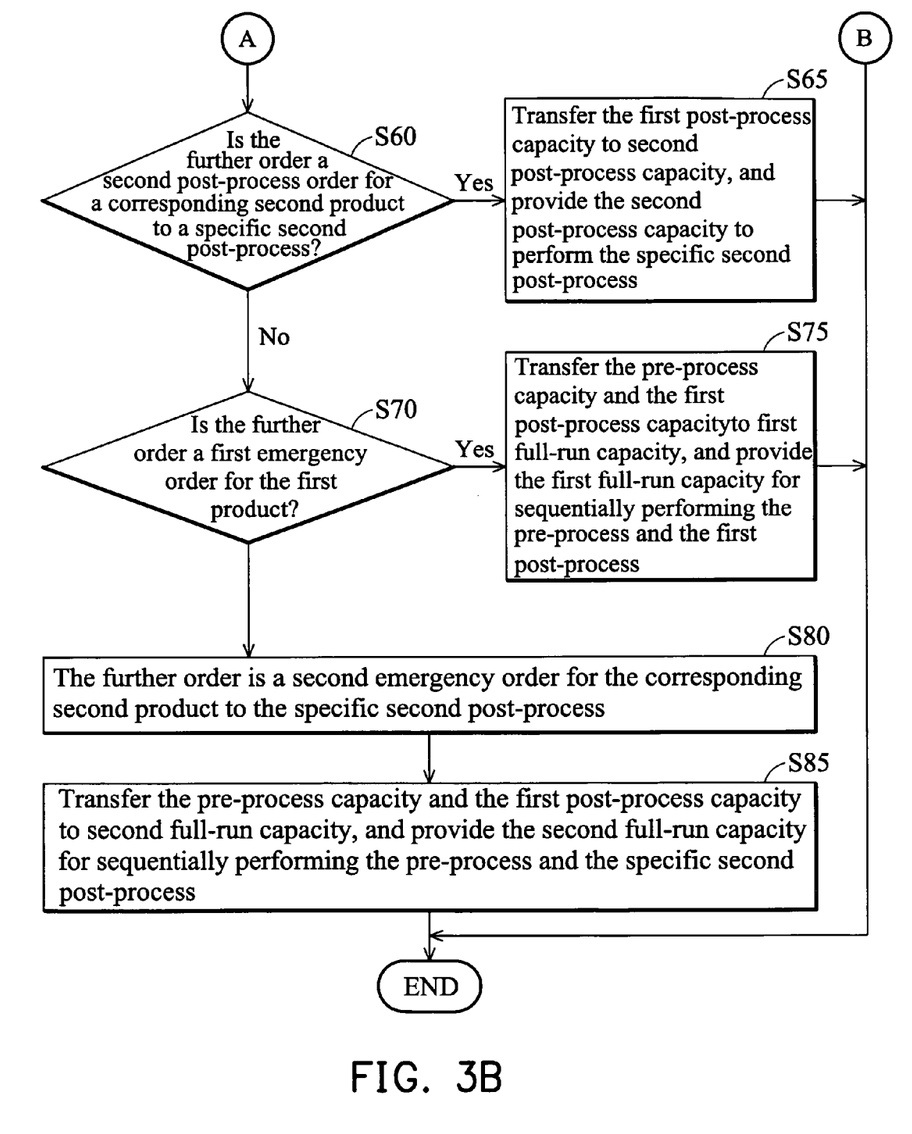

FIG. 3A and FIG. 3B are flowcharts depicting functionality (or methods), in accordance with one preferred embodiment of an implementation of reserving capacity for a pre-process order according to system in FIG. 2B. In an example, the method can be utilized in manufacturing a product family, such as a semiconductor product family including a first semiconductor product and a plurality of second semiconductor products.

Referring to FIG. 3A, a pre-process, a first post-process operation and a plurality of second post-process operations for a product family is arranged at step S10, in which the product family includes a first product corresponding to the first post-process operation and a plurality of second products corresponding to the second post-process operations. Thus, when a pre-process order for the product family related to the pre-process operation is received at step S20. At step S30, capacity for the pre-process operation and operating capacity for the first post-process operations is reserved. At step S32 the reserved pre-process capacity is provided for the pre-process operation such as manufacturing a plurality of components according to the pre-process order by performing the pre-process operation in FIG. 1 with the pre-process capacity. At step S34, a cutoff date for the product family is set.

If no further order related to the product family is received before the cutoff date at step S40, the order is released as remnant supply at step S45. When a further order is received before the cutoff date, at step S50, the further order is identified as a first post-process order for the first product related to the first post-process operation. If the further order is not a first post-process order for the first product related to the first post product, at step S60, a determination is made whether the further order is a second post-process order for a second product corresponding to a specific second post-process operation. If no, a determination is made at step S70, whether the further order is a first emergency order for the first product. If no, the process continues at step S80 where the further order is a second emergency order for the second product corresponding to the specific second post-process operation. Similarly, when the second emergency order for the second product corresponding to the specific second post-process operation is received, at step S85, the pre-process capacity and the first post-process operating capacity are transferred to second full-run capacity, and the second full-run capacity is provided for sequential enablement of the pre-process operation and the specific second post-process operation. The process then ends.

When the first post-process order for the first product related to the first post-process operation is received, at step S55, the first post-process operating capacity is provided for the first post-process operation. In an example, when the first post-process order is received, the components are retrieved from the stock in FIG. 1 for the first post-process operation. Thus, the first post-process operating capacity enables the first post-process operation on the components to obtain a plurality of the first products, i.e. the semiconductor products, for the first post-process order.

When the second post-process order for a second product corresponding to a specific second post-process operation is received, at step S65, the first post-process operating capacity is transferred to second post-process operating capacity, and the second post-process operating capacity is provided for the specific second post-process operation. In an example, when the second post-process order is received, the components are retrieved from the stock in FIG. 1 for the corresponding second post-process operation. Thus, the second post-process operating capacity is provided for the corresponding second post-process operation on the components to obtain a plurality of the second semiconductor products corresponding to the second post-process order.

At step S65, when the further order is a second post-process order for corresponding second product to a specific second post-process, a swap mechanism can be utilized to exchange the first post-process operating capacity and remnant supply in transferring the first post-process operating capacity to the second post-process operating capacity to meet the specific second post-process operation.

Further, when the first emergency order for the first product is received, at step S75, the pre-process capacity and the first post-process operating capacity are transferred to first full-run capacity, and the first full-run capacity is provided for sequential enablement of the pre-process operation and the first post-process operation.

With the system and method of reserving capacity for a pre-process order according to the present invention, capacity ATP can be achieved when receiving either a pre-process order or a post-process order, and effective scheduling of manufacturing operations for post-process orders is enabled.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A system for reserving capacity for a pre-process order, comprising:
   a process arrangement engine arranging a pre-process operation and a plurality of post-process operations for a product family, the product family comprising a plurality of products corresponding to the post-process operations;
   an order management module for receiving a purchase order for the product family before a cutoff date; and
   a capacity management module reserving capacity for the pre-process operation and one of the post-process operations and providing capacity for the pre-process operation when the order is a pre-process order, and providing post-process operating capacity for a specific post-process operation for the product corresponding to the specific post-process operation when the order is a post-process order corresponding to the specific post-process operation.

2. The system for reserving capacity for a pre-process order as claimed in claim 1, wherein the capacity management module is further configured to release the post-process operating capacity as remnant supply if the post-process order is not received before the cutoff date.

3. The system for reserving capacity for preprocess order as claimed in claim 1, wherein the capacity management module is further configured to transfer the pre-process capacity and the post-process operating capacity to full-run capacity when the order management module receives an emergency order for the specific product before the cutoff date, and the full-run capacity is provided to sequentially enable the pre-process operation and the corresponding post-process operation.

4. A method of reserving capacity for a pre-process order, comprising the steps of:
   providing a pre-process operation and a plurality of post-process operations for a product family, the product family comprising a plurality of products corresponding to the post-process operations;
   when receiving a pre-process order for the product family related to the pre-process, reserving capacity for pre-process operation and one of the post-process operations, and providing the pre-process capacity for the pre-process operation; and
   when receiving a post-process order for the product family related to one of the post-process operations corresponding to a specific product before a cutoff date, providing the post-process operating capacity for the corresponding post-process operation.

5. The method of reserving capacity for a pre-process order as claimed in claim 4, further comprising releasing the post-process operating capacity as remnant supply if the post-process order is not received before the cutoff date.

6. The method of reserving capacity for a pre-process order as claimed in claim 4, further comprising, when receiving an emergency order for the specific product before the cutoff date, transferring the pre-process capacity and the post-process operating capacity to full-run capacity, and providing the full-run capacity for sequential enablement of the pre-process operation and the post-process operation corresponding to the specific product.

7. The method of reserving capacity for a pre-process order as claimed in claim 4, wherein:
   the plurality of post-process operations comprises a first post-process operation and a plurality of second post-process operations;
   the product family comprises a first product corresponding to the first post-process operation and a plurality of second products corresponding to the second post-process operations; and
   the method further comprises:
   when receiving a pre-process order for the product family related to the pre-process, reserving capacity for the pre-process operation and operating capacity for the first post-process operations, and providing the pre-process capacity for the pre-process operation;
   when receiving a first post-process order for the first product related to the first post-process operation before a cutoff date, providing the capacity for the first post-process operation; and
   when receiving a second post-process order for a second product corresponding to a specific second post-process operation before the cutoff date, transferring the first post-process operating capacity to second post-process operating capacity and providing the second post-process operating capacity for the specific second post-process operation.

8. The method of reserving capacity for a pre-process order as claimed in claim 7, further comprising releasing the first post-process operating capacity as remnant supply if neither the first post-process order nor the second post-process order is received before the cutoff date.

9. The method of reserving capacity for a pre-process order as claimed in claim 7, wherein a swap mechanism is utilized to exchange the first post-process operating capacity and remnant supply transferring the first post-process operating capacity to the second post-process operating capacity to meet the specific second post-process operation.

10. The method of reserving capacity for a pre-process order as claimed in claim 7, further comprising the steps of:
    when receiving a first emergency order for the first product before the cutoff date, transferring the pre-process capacity and the first post-process operating capacity to first full-run capacity, and providing the first full-run capacity for sequential enablement of the pre-process operation and the first post-process operation; and
    when receiving a second emergency order for the second product corresponding to the specific second post-process operation, transferring the pre-process capacity and the first post-process operating capacity to second full-run capacity, and providing the second full-run capacity for sequential enablement of the pre-process operation and the specific second post-process operation.

11. A system for reserving capacity for a pre-process order, comprising:
a process arrangement engine arranging a pre-process, a first post-process operation and a plurality of second post-process operations for a product family, the product family comprising a first product corresponding to the first post-process operation and a plurality of second products corresponding to the second post-process operations;
an order management module for receiving a purchase order for the product family before a cutoff date; and
a capacity management module for reserving capacity for the pre-process operation and capacity for the first post-process operation and providing capacity for the pre-process operation when the order is a pre-process order, providing the capacity for the first post-process operation when the order is a first post-process order for the first product, and transferring the first post-process operating capacity to second post-process operating capacity and providing the second post-process operating capacity for a specific second post-process operation when the order is a second post-process order for a second product corresponding to the specific second post-process operation.

12. The system for reserving capacity for a pre-process order as claimed in claim 11, wherein the capacity management module is further configured to release the first post-process operating capacity as remnant supply if neither the first post-process order nor the second post-process order is received before the cutoff date.

13. The system for reserving capacity for a pre-process order as claimed in claim 11, wherein the capacity management module is further configured to utilize a swap mechanism to exchange the first post-process operating capacity and remnant supply in transferring the first post-process operating capacity to the second post-process operating capacity to meet the specific second post-process operation.

14. The system for reserving capacity for a pre-process order as claimed in claim 11, wherein the capacity management module is further configured to transfer the pre-process capacity and the first post-process operating capacity to first full-run capacity when the order management module receives a first emergency order for the first product before the cutoff date, and the first full-run capacity is provided for sequential enablement of the pre-process operation and the first post-process operation.

15. The system for reserving capacity for a pre-process order as claimed in claim 11, wherein the capacity management module is further configured to transfer the pre-process capacity and the first post-process operating capacity to second full-run capacity when the order management module receives a second emergency order for the second product corresponding to the specific second post-process operation before the cutoff date, and the second full-run capacity is provided for sequential enablement of the pre-process operation and the specific second post-process operation.

16. A system for reserving capacity for a pre-process order in a semiconductor foundry, comprising:
a process arrangement engine arranging a pre-process, a first post-process operation and a plurality of second post-process operations for a semiconductor product family according to a plurality of lots in the semiconductor foundry, the semiconductor product family comprising a first semiconductor product corresponding to the first post-process operation and a plurality of second semiconductor products corresponding to the second post-process operations;
an order management module for receiving a purchase order for the semiconductor product family before a cutoff date; and
a capacity management module reserving capacity for the pre-process operation and capacity for the first post-process operation and providing capacity for the pre-process operation when the order is a pre-process order, providing the capacity for the first post-process operation when the order is a first post-process order for the first semiconductor product, and transferring the first post-process operating capacity to second post-process operating capacity and providing the second post-process operating capacity for a specific second post-process operation when the order is a second post-process order for a second semiconductor product corresponding to the specific second post-process operation.

17. The system for reserving capacity for a pre-process order in a semiconductor foundry according to claim 16, wherein the capacity management module is further configured to release the first post-process operating capacity as remnant supply if neither the first post-process order nor the second post-process order is received before the cutoff date.

18. The system for reserving capacity for a pre-process order in a semiconductor foundry according to claim 16, wherein the capacity management module is further configured to utilize a swap mechanism to exchange the first post-process operating capacity and remnant supply in transferring the first post-process operating capacity to the second post-process operating capacity for the specific second post-process operation.

19. The system for reserving capacity for a pre-process order in a semiconductor foundry according to claim 16, wherein the capacity management module is further configured to transfer the pre-process capacity and the first post-process operating capacity to first full-run capacity when the order management module receives a first emergency order for the first semiconductor product before the cutoff date, and the first full-run capacity is provided for sequential enablement of the pre-process operation and the first post-process operation.

20. The system for reserving capacity for a pre-process order in a semiconductor foundry according to claim 16, wherein the capacity management module is further configured to transfer the pre-process capacity and the first post-process operating capacity to second full-run capacity when the order management module receives a second emergency order for the second semiconductor product corresponding to the specific second post-process operation before the cutoff date, and the second full-run capacity is provided for sequential enablement of the pre-process operation and the specific second post-process operation.

21. A method of reserving capacity for a pre-process order in a semiconductor foundry, comprising the steps of:
providing a pre-process, a first post-process operation and a plurality of second post-process operations for a semiconductor product family according to a plurality of lots in the semiconductor foundry, the semiconductor product family comprising a first semiconductor product corresponding to the first post-process operation and a plurality of second semiconductor products corresponding to the second post-process operations;

when receiving a pre-process order for the semiconductor product family related to the pre-process, reserving capacity for the pre-process operation and operating capacity for the first post-process operations, and providing the pre-process capacity for the pre-process operation;

when receiving a first post-process order for the first semiconductor product related to the first post-process operation before a cutoff date, providing the capacity for the first post-process operation; and when receiving a second post-process order for a second semiconductor product corresponding to a specific second post-process operation before the cutoff date, transferring the first post-process operating capacity to second post-process operating capacity and providing the second post-process operating capacity for the specific second post-process operation.

22. The method of reserving capacity for a pre-process order in a semiconductor foundry according to claim 21, further comprising releasing the first post-process operating capacity as remnant supply if neither the first post-process order nor the second post-process order is received before the cutoff date.

23. The method of reserving capacity for a pre-process order in a semiconductor foundry according to claim 21, wherein a swap mechanism is utilized to exchange the first post-process operating capacity and remnant supply in transferring the first post-process operating capacity to the second post-process operating capacity to meet the specific second post-process operation.

24. The method of reserving capacity for a pre-process order in a semiconductor foundry according to claim 21, further comprising the steps of:

when receiving a first emergency order for the first semiconductor product before the cutoff date, transferring the pre-process capacity and the first post-process operating capacity to first full-run capacity, and providing the first full-run capacity for sequential enablement of the pre-process operation and the first post-process operation; and when receiving a second emergency order for the second semiconductor product corresponding to the specific second post-process operation before the cutoff date, transferring the pre-process capacity and the first post-process operating capacity to second full-run capacity, and providing the second full-run capacity for sequential enablement of the pre-process operation and the specific second post-process operation.

25. A manufacturing method of a semiconductor product family comprising a first semiconductor product and a plurality of second semiconductor products, the manufacturing method comprising the steps of: providing a pre-process, a first post-process operation and a plurality of second post-process operations for the semiconductor product family, the first semiconductor product corresponding to the first post-process operation, and each of second semiconductor products corresponding to each of the second post-process operations;

receiving a pre-process order for the semiconductor product family related to the pre-process operation before a cutoff date;

reserving capacity for the pre-process operation and operating capacity for the first post-process operations;

manufacturing a plurality of components according to the pre-process order by performing the pre-process operation with the pre-process capacity;

when receiving a first post-process order for the first semiconductor product related to the first post-process operation before the cutoff date, performing the first post-process operation on the components with the first post-process operating capacity to obtain a plurality of the first semiconductor products for the first post-process order; and when receiving a second post-process order for a second semiconductor product corresponding to a specific second post-process operation before the cutoff date, transferring the first post-process operating capacity to second post-process operating capacity and performing the corresponding second post-process operation on the components with the second post-process operating capacity to obtain a plurality of the second semiconductor products corresponding to the second post-process order.

26. The manufacturing method as claimed in claim 25, further comprising storing the components in stock to provide a component inventory for the semiconductor product family.

27. The manufacturing method as claimed in claim 26, further comprising retrieving the components from the stock for the first post-process operation when receiving the first post-process order and for the second post-process operation when receiving the second post-process order.

28. The manufacturing method as claimed in claim 25, wherein a swap mechanism is utilized to exchange the first post-process operating capacity and remnant supply in transferring the first post-process operating capacity to the second post-process operating capacity to meet the specific second post-process operation.

29. The manufacturing method as claimed in claim 25, further comprising the steps of:

when receiving a first emergency order for the first semiconductor product before the cutoff date, transferring the pre-process capacity and the first post-process operating capacity to first full-run capacity, and providing the first full-run capacity for sequential enablement of the pre-process operation and the first post-process operation;

when receiving a second emergency order for the second semiconductor product corresponding to the specific second post-process operation, transferring the pre-process capacity and the first post-process operating capacity to second full-run capacity, and providing the second full-run capacity for sequential enablement of the pre-process operation and the specific second post-process operation; and when neither the first post-process order nor the second post-process order is received before the cutoff date, releasing the first post-process operating capacity as remnant supply.

* * * * *